United States Patent [19]

Holness

[11] Patent Number: 5,526,300
[45] Date of Patent: Jun. 11, 1996

[54] WAVEFORM PROCESSOR AND WAVEFORM PROCESSING METHOD

[76] Inventor: Peter J. Holness, Bae Defence Ltd, Six Hills Way, Stevenage, Herts, SG1 2DA, Great Britain

[21] Appl. No.: 322,512

[22] Filed: Oct. 14, 1994

[30] Foreign Application Priority Data

Oct. 15, 1993 [GB] United Kingdom ............... 9321365

[51] Int. Cl.$^6$ .................... G06G 7/16; G06F 1/02
[52] U.S. Cl. ........................... 364/851; 364/718
[58] Field of Search ........................ 364/851, 807, 364/718; 327/105

[56] References Cited

U.S. PATENT DOCUMENTS 3,789,203  1/1974  Catherall et al. ............. 364/735
3,962,573  6/1976  Staley ............................ 364/735
4,992,714  2/1991  Matsushita et al. .
5,107,377  4/1992  Ballard .
5,267,189  11/1993  Wilke ............................ 364/851

FOREIGN PATENT DOCUMENTS 364909   4/1990  European Pat. Off. .
509713  10/1992  European Pat. Off. .

*Primary Examiner*—Tan V. Mai
*Attorney, Agent, or Firm*—Cushman, Darby & Cushman

[57] ABSTRACT

Apparatus for analysis and filtering complex waveforms using a method of waveform generation which creates a sequence of output values, each output value comprising the calculated result of a Portmanteau function generator equation and argument. In one embodiment, the output values are subtracted from a complex waveform to yield a filtered, modified waveform for further inspection on an oscilloscope for example.

6 Claims, 1 Drawing Sheet

WAVEFORM PROCESSOR AND WAVEFORM PROCESSING METHOD

BACKGROUND OF THE INVENTION

1. Field of the Invention

This invention relates to an apparatus and method for analyzing, filtering and demodulating analog waveforms.

The invention has particular application to the analysis of complex waveforms and especially in cases where a waveform of interest carries unwanted distortion components. The invention provides a means for removing any unwanted distortion so that the desired waveform may be recovered, i.e., certain waveform components can be filtered out.

2. Description of the Related Art

The invention's embodiments exploit a method of waveform generation which creates a sequence of output values, each comprising the calculated result of a generator equation. This method and apparatus therefor are described in detail in my co-pending European Patent Application EP-A-509,713.

Certain generator equations, an example of which could be the inverse of a trigonometric function, e.g., arc.cos(Sin P), are referred to in the aforesaid co-pending Application as "Portmanteau functions". Herein, a Portmanteau Function can be any generator equation.

SUMMARY OF THE INVENTION

This invention comprises an apparatus for processing an analog waveform having an unwanted component. The apparatus includes:

means for converting the analog waveform into a digital signal having a first set of digital values;

calculator means for receiving a sequence of input values which form the argument of a generator equation to create a second set of digital values, each value comprising the calculated result of the generator equation;

and means for combining the second set of digital values with the first set of digital values to produce a modified set of digital values representing a modified version of the analog waveform, thereby removing the unwanted component.

The second set of digital values represent the unwanted component of the analogue waveform.

If the unwanted component is a noise signal, for example, then the second set of values can be subtracted from the first (or added if the signal is inverted) to leave the modified, wanted signal.

If the unwanted component is a modulation signal, then the second set of values can be multiplied with or divided into the first set, as appropriate, in order to remove the modulation component and restore the original waveform.

Preferably, analyzing means are employed for determining characteristic parameters of the waveform. The analyzing means could comprise an oscilloscope so that the waveform characteristics can be determined by visual inspection. Alternately, a computer could be employed for performing a waveform matching algorithm.

The apparatus may further include a digital to analog converter for converting the modified set of digital values into analog form. This enables the modified version of the original analog waveform to be viewed on an oscilloscope, for example, or to be used in a further analog processing operation.

BRIEF DESCRIPTION OF THE DRAWINGS

An embodiment of the invention will now be described, by way of example only, with reference to the drawings of which.

DETAILED DESCRIPTION OF THE PREFERRED EMBODIMENT

Figure 1:
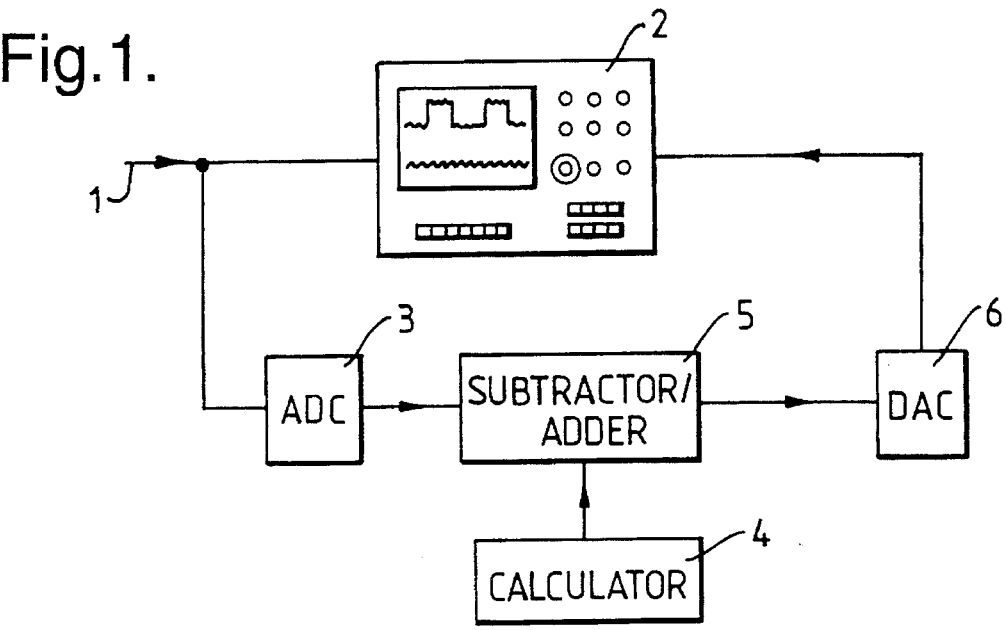
FIG. 1 is a block diagram of a waveform processing apparatus in accordance with the invention.

In FIG. 1, an input analog waveform on line 1 is fed into an oscilloscope 2 for visual inspection and into an analog to digital converter (ADC) 3. The outputs from the ADC 3 and from a calculator 4 are fed to a subtractor/adder 5, whose output in turn is fed to a digital to analog converter (DAC) 6. The output from the DAC 6 is displayed on the oscilloscope 1 for comparison with the input analog waveform.

Figure 2:
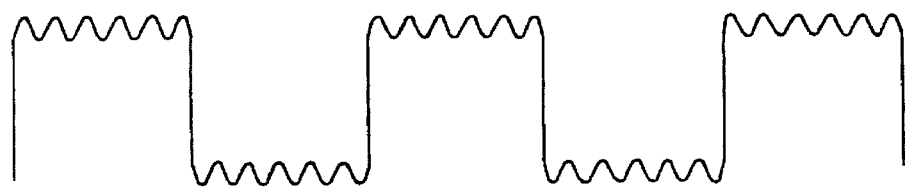
FIG. 2 shows an input analog waveform.

In this example, the analog waveform to be processed is illustrated in FIG. 2. Initially, the waveform is viewed on the screen of the oscilloscope 2. It is observed that the waveform is essentially a square wave including some ringing. Suppose that it is desired to remove the square wave component so that the ringing can be viewed or analyzed or used in some way. By means of the oscilloscope, the period and amplitude of the square wave can be determined.

Once these characteristic parameters of the square wave component have been established, the calculator is programmed, via a keyboard, for example, to generate digital values representing a square wave as near identical as possible to the square wave component of the waveform appearing on line 1.

By visual inspection, the analog waveform has been identified as having a square wave component and some ripple, and hence, could be represented by a mathematical expression like;

$$y(P)=A \, sgn \, (1 sin \, P)+1/B \, sin \, BP$$

This representation of waveforms is discussed in my aforementioned co-pending Application and is referred to therein as the sum of a Portmanteau term (A sgn (sin P)) and a Fourier term (1/B sin BP). It can readily be seen from the above expression for y(P) that if the Portmanteau (Square wave) term is subtracted therefrom (or its inverse is added thereto) then the remainder will be the ringing factor, which is the desired waveform in this example.

Hence, the calculator is given the Portmanteau Function:

$$G(P)=A \, sgn \, (sin \, P)$$

and a sequence of values of P between predetermined limits (which depend on the parameters deduced from visual inspection of the input waveform on the oscilloscope) and instructed to output the calculated result in digital form. This calculated result is then subtracted by the subtracter/adder 5 from the digital representation of the input analog waveform, this being provided by the ADC 3.

Figure 3:
FIG. 3 shows an output modified waveform.

The output from the subtracter/adder 5 is converted to analog form by the DAC 6 and displayed on the oscilloscope 2. This resulting, modified waveform will be the ringing portion of the input waveform represented by the equation;

$$y'(P)=1/B \, sin \, BP \, ( \text{see FIG. 3} ).$$

If the Portmanteau Function is not a perfect match to the unwanted component, then some distortion of the displayed modified waveform will be apparent. In such cases, the Function can be modified as appropriate and the process repeated. Once the desired waveform has been obtained at the output of the DAC 6, it can be used in a further processing operation or analyzed by means of a spectrum analyzer, e.g., rather than an oscilloscope.

From the above example, it can be appreciated that the invention can be used as an analyzer, having the capability to split a complex waveform into simple components and thereby analyze its constituents.

Also, the invention can be used as a filter by removing unwanted components from a distorted waveform. In an alternative arrangement of the above example, the ringing could have been removed from the input waveform to leave an undistorted square wave. This, of course, could be done by programming the calculator 4 to operate on the generator equation y'(P)=1/B sin BP rather than G(P) above.

The invention can further be employed as a demodulator. This can readily be achieved by replacing the subtractor/adder 5 of FIG. 1 with a multiplier or divider.

Figure 4:
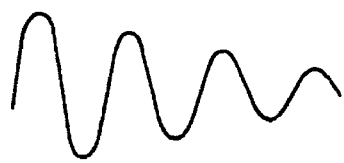
FIG. 4 shows a second input analog waveform.

For example, FIG. 4 shows a decaying sinusoid which could be represented by the mathematical expression;

$$y(P)=(A\sin P)e^{-\alpha t}$$

By generating a second set of digital values representing the term $e^{-\alpha t}$ and dividing it into the first set of values (or, alternatively multiplying by $e^{\alpha t}$), the attenuation superimposed on the sinusoidal signal can be removed. Other modulation components such as FM and AM can be removed in a similar way.

I claim:

1. Apparatus for processing an analog waveform, said analog waveform having a first component, said apparatus comprising:

means for converting said analog waveform into a digital signal having a first set of digital values;

calculator means receiving a sequence of input values which define an argument of a Portmanteau function generator equation for creating a second set of digital values each comprising a calculated result of said Portmanteau function generator equation and said argument; and means for combining said second set of digital values with said first set of digital values to produce a modified set of digital values representing a modified version of said analog waveform, thereby removing said first component.

2. Apparatus according to claim 1, further comprising analyzing means for determining characteristic parameters of said analog waveform.

3. Apparatus according to claim 1, further comprising a digital to analog converter for converting said modified set of digital values into analog form.

4. A method of processing an analog waveform, said analog waveform having a first component, the method comprising the steps of:

converting said analog waveform into a digital signal having a first set of digital values;

receiving a sequence of input values which define an argument of a Portmanteau function generator equation;

creating a second set of digital values each comprising a calculated result of said Portmanteau function generator equation and said argument; and combining said second set of digital values with said first set of digital values to produce a modified set of digital values representing a modified version of said analog waveform.

5. A method of processing an analog waveform according to claim 4, further comprising the step of determining characteristics of said analog waveform.

6. A method of processing an analog waveform according to claim 4, further comprising the step of converting said modified set of digital values into analog form.

* * * * *